3,267,144
PROCESS FOR PREPARING SELECTED BIS(ISO-CYANIDE DICHLORIDES)
Gerhard F. Ottmann, Hamden, and Haywood Hooks, Jr., West Haven, Conn., assignors to Olin Mathieson Chemical Corporation, New Haven, Conn., a corporation of Virginia
No Drawing. Filed Oct. 28, 1963, Ser. No. 319,573
2 Claims. (Cl. 260—566)

This invention relates to a series of bis(isocyanide dichlorides) and to a process for the preparation of these derivatives. More particularly, it relates to organic compounds having the following general formula:

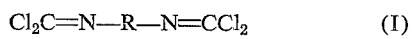

$$Cl_2C=N-R-N=CCl_2 \quad (I)$$

wherein R represents an alkylene group having two to ten carbon atoms or a cyclohexyl group.

Mono-isocyanide dichlorides have been previously prepared and reported in the literature. For example, it has been disclosed in German Patent 1,126,371 than monoisocyanide dichlorides can be prepared by the reaction of alkyl monoisocyanates with phosphorus pentachloride in a phosphorus oxychloride solvent. However, attempts to extend this reaction to diisocyanates to provide bis (isocyanide dichlorides) have been heretofore unsuccessful. Invariably, mixtures were obtained from which the bis(isocyanide dichlorides) could not be isolated.

Therefore, the principal object of this invention was to provide bis(isocyanide dichlorides) having the general Formula I in good purity. Another object of this invention was to provide an efficient and direct process for the preparation of the aforementioned derivatives in good yield and high purity.

These objects have been accomplished in accordance with the present invention. It has been found that compounds having the Formula I can be prepared in high purity when diisocyanates having the formula $R(NCO)_2$ (R is as defined above) are reacted with a molar excess of phosphorus pentachloride in a phosphorus oxychloride solvent. A particular molar excess of $PCl_5$ must be utilized in order to obtain and isolate pure bis(isocyanide dichlorides). It has been found that a molar ratio of phosphorus pentachloride to diisocyanates of at least 2.8 must be employed in the process disclosed and claimed herein.

Using the above recited ratio of reactants, the dichlorides (I) can be prepared at reaction temperatures ranging from about 0° to 110° C., although a preferred reaction temperature of about 20° to 40° C. can advantageously be utilized. Upon completion of the reaction period, the unreacted phosphorus pentachloride is usually removed from the reaction mixture by conventional means such as by a filtration technique. The phosphorus oxychloride solvent is then removed from the reaction mixture by distillation, preferably in vacuo. The residual product is purified and isolated either by distillation, or if it is a solid by recrystallization from appropriate solvents.

A series of alkylene diisocyanates can be used as starting intermediates in the preparation of the compounds of this invention. For example, suitable diisocyanates can be prepared by the well-known reaction of ethylene diamine, decamethylene diamine, etc. with phosgene. Similarly, various isomeric cyclohexyl diisocyanates are useful as intermediates in the formation of compounds included in the Formula I.

The following examples will serve to illustrate the preparation of various bis(isocyanide dichlorides) in accordance with this invention.

Example 1

A mixture of 186 g. (0.90 mole) of $PCl_5$ and 200 mls. of $POCl_3$ was placed in a one-liter reaction flask equipped with stirrer. Then 50 g. (0.30 mole) of hexamethylene-1,6-diisocyanate was added dropwise over a one hour period during which time the temperature of the reaction mixture rose from 24° C. to 29° C. The mixture was stirred overnight at room temperature. Finally, the mixture was heated for one hour at reflux temperature with stirring. Excess $PCl_5$ was removed from the reaction mixture by filtration. The $POCl_3$ was recovered from the mixture by distillation. The resulting liquid residue was dissolved in ether, filtered and distilled. A colorless liquid having a boiling point of 118°–120° C./0.75 mm. and $n_D^{26}$ 1.5020 was obtained. The following analytical data revealed that hexamethylene-1,6-bis(isocyanide dichloride) had been obtained.

*Analysis.*—Calcd. for $C_8H_{12}N_2Cl_4$: C, 34.58; H, 5.32; N, 10.07; Cl, 51.2. Found: C, 34.73; H, 4.62; N, 9.95; Cl, 51.3.

A small amount of chlorohexyl-6-isocyanide dichloride boiling at 71°–73° C./3 mm. was also obtained as a by-product.

Example 2

Using a procedure similar to that of Example 1, 47.0 g. (0.333 mole) of tetramethylene-1,4-diisocyanate was reacted with 210 g. (1.01 mole) of $PCl_5$ in 210 mls. of $POCl_3$. A colorless liquid was obtained; boiling point 74°–76° C./0.03 mm., $n_D^{24.5}$ 1.5094. The following analytical data revealed that tetramethylene-1,4-bis(isocyanide dichloride) had been obtained.

*Analysis.*—Calcd. for $C_6H_8N_2Cl_4$: C, 63.2; H, 9.27; N, 27.6. Found: C, 62.9; H, 9.66; N, 26.87.

Example 3

Using a procedure similar to that of Example 1, 33.2 g. (0.20 mole) of cyclohexane-1,4-diisocyanate was reacted with 127.0 g. (0.61 mole) of $PCl_5$ in 130 mls. of $POCl_3$. At the end of the reaction period, $PCl_5$ was filtered from the reaction mixture. The $POCl_3$ was then recovered from the mixture by distillation, and there was obtained a solid residue. This solid was recrystallized from heptane, and shiny crystals having a melting point of 123°–124° C. were obtained. The following analytical data revealed that cyclohexane-1,4-bis(isocyanide dichloride) had been obtained.

*Analysis.*—Calcd. for $C_8H_{10}N_2Cl_4$: C, 34.80; H, 3.65; N, 10.13; Cl, 51.5. Found: C, 34.50; H, 3.80; N, 10.15; Cl, 52.0.

Example 4

Cyclohexane-1,3-bis(isocyanide dichloride) was prepared using the procedure of Example 1 wherein cyclohexane-1,3-diisocyanate was reacted with $PCl_5$ in a $POCl_3$ solvent. The dichloride obtained here was a colorless liquid, B.P. 95° C./0.5 mm.

The bis(isocyanide dichlorides) disclosed and claimed herein are characterized by valuable biological properties and are useful agricultural chemicals. They have been found to be useful insecticides in the combating of various harmful insects probably due to the high chlorine content in these derivatives. They have shown effectiveness as nematocides particularly in the controlling of the root-knot eelworm *Meloidogyne incognita* on tomtao plants.

The dichlorides (I) are also useful as intermediates in the preparation of the corresponding N-alkylene guanidines as described in copending application Serial No. 319,521, filed October 28, 1963, wherein the dichlorides are reacted with ethylenimine and its homologs. These guanidines are useful as insect sterilants, and a number of insect-sterilant compositions containing the guanidines as the active ingredient have been prepared.

What is claimed is:

1. A process for preparing bis(isocyanide dichlorides) which comprises reacting
    (a) diisocyanates having the formula $R(NCO)_2$ wherein R is selected from the class consisting of alkylene groups having two–ten carbon atoms and a cyclohexyl group, with
    (b) phosphorus pentachloride, the molar ratio of said pentachloride to said diisocyanates being at least 2.8;

said reaction being performed in a phosphorus oxychloride solvent at a reaction temperature of between about 0°–110° C., removing unreacted phosphorus pentachloride from the reaction mixture, and isolating the bis(isocyanide dichlorides).

2. The process of claim 1 wherein a reaction temperature range of 20°–40° C. is utilized.

References Cited by the Examiner
FOREIGN PATENTS 1,094,737 12/1960 Germany.
1,126,371 3/1962 Germany.

CHARLES B. PARKER, *Primary Examiner.*

R. V. HINES, *Assistant Examiner.*